(12) United States Patent
Decker

(10) Patent No.: US 10,101,237 B2
(45) Date of Patent: Oct. 16, 2018

(54) TEST LEAK DEVICE HAVING INTEGRATED PRESSURE SENSOR

(71) Applicant: Inficon GmbH, Cologne (DE)

(72) Inventor: Silvio Decker, Cologne (DE)

(73) Assignee: INFICON GmbH (DE)

( * ) Notice: Subject to any disclaimer, the term of this patent is extended or adjusted under 35 U.S.C. 154(b) by 314 days.

(21) Appl. No.: 14/907,355

(22) PCT Filed: Jul. 30, 2014

(86) PCT No.: PCT/EP2014/066391
§ 371 (c)(1),
(2) Date: Jan. 25, 2016

(87) PCT Pub. No.: WO2015/014899
PCT Pub. Date: Feb. 5, 2015

(65) Prior Publication Data
US 2016/0146694 A1 May 26, 2016

(30) Foreign Application Priority Data

Aug. 2, 2013 (DE) .......................... 10 2013 215 278

(51) Int. Cl.
*G01M 3/00* (2006.01)
*G01L 19/08* (2006.01)
*G01M 3/28* (2006.01)

(52) U.S. Cl.
CPC ........... *G01M 3/007* (2013.01); *G01L 19/086* (2013.01); *G01M 3/2815* (2013.01)

(58) Field of Classification Search
CPC ..................................... G01M 3/007

USPC .................................. 73/40–49.3, 1.01–1.07
See application file for complete search history.

(56) References Cited

U.S. PATENT DOCUMENTS

| 4,899,574 A | 2/1990 | Potteiger |
| 6,595,040 B1 | 7/2003 | Widt et al. |
| 7,168,287 B2 | 1/2007 | Rolff |
| 8,448,498 B1 | 5/2013 | Kelley |
| 2006/0144120 A1 | 7/2006 | Tang et al. |
| 2006/0150707 A1 | 7/2006 | Rolff |
| 2007/0261476 A1 | 11/2007 | Hilgers |
| 2008/0252470 A1 | 10/2008 | Taricco |
| 2010/0326165 A1 | 12/2010 | Rauworth et al. |
| 2011/0140850 A1 | 6/2011 | Wassel et al. |
| 2011/0264033 A1 | 10/2011 | Jensen et al. |
| 2012/0095351 A1 | 4/2012 | Klose et al. |

FOREIGN PATENT DOCUMENTS

| DE | 19906941 A1 | 8/2000 |
| DE | 19963073 A1 | 6/2001 |
| JP | 62175639 A | 8/1987 |
| JP | 63109626 U | 7/1988 |
| JP | 1126543 U | 8/1989 |
| JP | 2113145 U | 9/1990 |

(Continued)

*Primary Examiner* — Robert R Raevis
(74) *Attorney, Agent, or Firm* — The Webb Law Firm

(57) ABSTRACT

A test leak device for calibrating or testing leak detection apparatuses, said test leak device having a pressurized gas container that has an inlet for filing in a test gas and a leak that has a predefined leak rate. The test leak device has an integrated pressure sensor that monitors the pressure in the pressurized gas container and is designed for the wireless transmission of the measured pressure values to a receiver.

8 Claims, 1 Drawing Sheet

(56) References Cited

FOREIGN PATENT DOCUMENTS

| | | | |
|---|---|---|---|
| JP | 2232544 | A | 9/1990 |
| JP | 55671 | A | 1/1993 |
| JP | 5240729 | A | 9/1993 |
| JP | 6102134 | A | 4/1994 |
| JP | 11287866 | A | 10/1999 |
| JP | 2000292301 | A | 10/2000 |
| JP | 2006500597 | A | 1/2006 |
| JP | 2006189425 | A | 7/2006 |
| JP | 2007510918 | A | 4/2007 |
| JP | 200992460 | A | 4/2009 |
| JP | 2010145329 | A | 7/2010 |
| JP | 2010256018 | A | 11/2010 |
| JP | 2013143101 | A | 7/2013 |

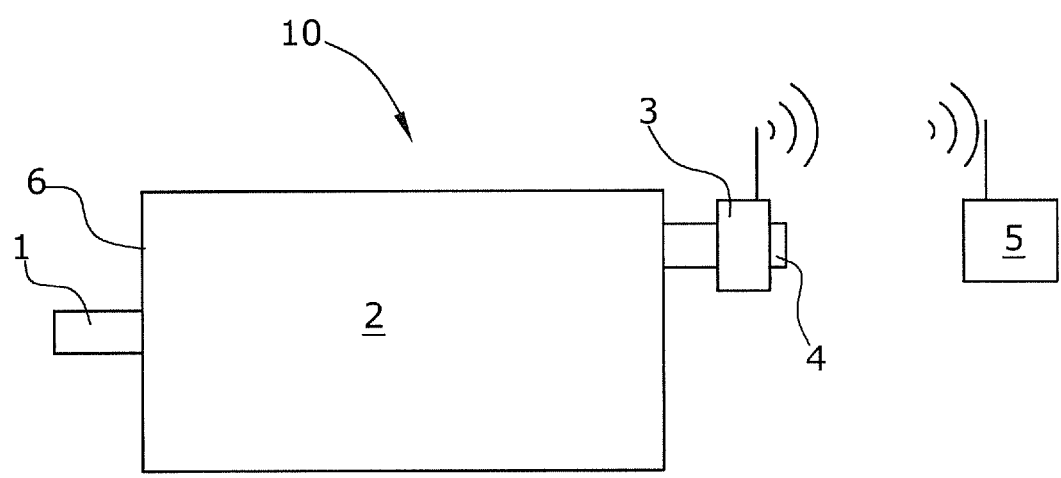

TEST LEAK DEVICE HAVING INTEGRATED PRESSURE SENSOR

CROSS-REFERENCE TO RELATED APPLICATIONS

This application is the United States national phase of International Application No. PCT/EP2014/066391 filed Jul. 30, 2014, and claims priority to German Patent Application No. 10 2013 215 278.7 filed Aug. 2, 2013, the disclosures of which are hereby incorporated in their entirety by reference.

BACKGROUND OF THE INVENTION

Field of the Invention

The invention relates to a test leak device for the calibrating or testing of leak detection apparatuses.

Description of Related Art

Test leak devices comprise a pressurized gas container which, via an inlet, will be filled with test gas and be pressurized. The pressurized gas container is provided with a leak having a predefined leak rate. The test gas exiting via the test leak will flow out at the predefined leak rate. The outflowing test gas can be measured by a leak detection apparatus for checking the functional precision of this leak detection apparatus or for calibrating it.

In a test leak, the predefined leak rate is of decisive importance and should not undergo variations over time. The leak rate is influenced by the pressure in the pressurized gas container, by the gas temperature and by the volume of the pressurized gas container. Up to now, test leaks have been subjected to high pressure, and the volume of the pressurized gas container has been selected to be so large that the change of the leak rate caused by the pressure loss is low.

It is also known to record the temperature over the life cycle of the test leak and to compute the leak rate with the aid of theoretical assumptions on the pressure loss in the test leak. Direct measurement of the pressure has up to now been disadvantageous because the employed leak detection apparatuses are relatively large-sized and expensive and require a cable connection for data transmission and for power supply. Computation of the current leak rate with the aid of theoretical assumptions on the pressure loss on the basis of the measured temperature involves the danger that large variations of the temperature or unforeseen pressure losses could cause considerable errors. Errors resulting from massive leakiness on the test leak cannot be detected by this method.

SUMMARY OF THE INVENTION

It is an object of the invention to provide for an improved monitoring of the leak rate of a test leak device.

The test leak device comprises an integrated pressure sensor for monitoring the pressure in the pressurized gas container and is designed for wireless transmission of the measured pressure values to a receiver. This obviates the need for a complicated computation of the leak rate, e.g. on the basis of measured temperatures, and makes it possible to determine the respective current leak rate independently from the filling level of the pressurized gas container. The pressure measurement values can be read out in a wireless manner, thus allowing for mobile use of the test leak e.g. for calibrating a plurality of apparatuses at different sites. The pressure prevailing in the pressurized gas container can be monitored, and a pressure loss and—thus—faulty calibrating processes can be detected.

The pressure sensor is preferably arranged at the inlet, e.g. at an inlet valve. The pressure measured at this valve will be transmitted wirelessly to a spatially remote receiver designed for wireless reception of the pressure measurement values. Said receiver can be a part of the test leak device and further be designed for radio-controlled initiation of the calibrating process or for operating the inlet valve. For this purpose, the test leak device is advantageously also designed to receive signals from the receiver. For example, the pressure sensor is designed to receive wireless signals and comprises a control device for opening and closing the inlet, said control device being activated by wirelessly transmitted instructions.

It is of particular advantage if the test leak device comprises a memory, e.g. of the electric or magnetic type, in which the leak rate of the test leak has been lodged. The test leak device should then be adapted to transmit the stored leak rate to the receiver in a wireless manner, e.g. with the aid of RFID technology. In this case, said memory can be an RFID chip.

Preferably, the pressure sensor is provided with a battery powering the sensor, wherein the lifespan of the battery is longer than the useful life of the test leak.

BRIEF DESCRIPTION OF THE DRAWING

The FIGURE shows a schematic representation of the test leak device.

DETAILED DESCRIPTION OF THE INVENTION

The test leak device 10 comprises a pressurized gas container 2 in whose wall 6 the test leak 1 is provided in the form of a capillary leak or permeation leak having a constant predetermined leak rate. On the side opposite to leak 1, the pressurized gas container 2 is provided with an inlet 4 in the form of a filling valve. Via said inlet 4, the pressurized gas container 2 will be filled with pressurized test gas.

Inlet 4 is provided with a pressure sensor 3 operative to measure the gas pressure within pressurized gas container 2 and to communicate said pressure in a wireless manner to a receiver 5. Pressure sensor 3 is provided with a battery having a lifespan that is longer than the useful life of the test leak device 10. The measurement values of pressure sensor 3 are permanently emitted to receiver 5, thus allowing for a continuous, spatially independent monitoring of the pressure in pressurized gas container 2 so that deviations from the predetermined leak rate will be detected early.

The test leak device 10 is provided with a memory, not shown in the FIGURE, in the form of an RFID chip having the leak rate value of leak 1 stored in it. Receiver 5 is adapted to also read the stored leak rate value. Thereby, it is rendered possible to detect deviations from the leak rate in a spatially independent and reliable manner in merely one device, i.e. the receiver 5.

The invention claimed is:

1. A test leak device for the calibrating or testing of leak detection apparatuses, comprising:
    a pressurized gas container having an inlet for filling in a test gas, wherein the pressurized gas container includes a leak configured to leak the test gas with a predefined leak rate; and a pressure sensor monitoring the pressure in the pressurized gas container, wherein the pressure sensor is configured for wireless transmission of the measured pressure values to a receiver.

2. The test leak device according to claim 1, wherein the pressure sensor is arranged at the inlet.

3. A test leak system comprising:
the test leak device according to claim 1; and
the receiver configured for wireless reception of the pressure measurement values, wherein the receiver is spatially remote from the test leak device.

4. The test leak system according to claim 3, further comprising:
a wirelessly readable memory storing data including the predefined leak rate, wherein the memory is configured for wireless transmission of the stored data.

5. The test leak system according to claim 4, wherein said memory includes a radio frequency identification (RFID) chip, and wherein the receiver is further configured to receive the stored data via RFID technology.

6. The test leak device according to claim 1, wherein the pressure sensor is configured to receive wireless signals and comprises a control device for opening and closing the inlet, said control device being activated by wirelessly transmitted instructions.

7. The test leak device according to claim 1, wherein said leak includes a capillary leak or a permeation leak in a wall of the pressurized gas container.

8. The test leak device of claim 1, wherein the pressure sensor is directly connected to the inlet.

* * * * *